United States Patent
Casner et al.

(10) Patent No.: US 10,237,512 B1
(45) Date of Patent: Mar. 19, 2019

(54) AUTOMATED IN-PLAY DETECTION AND VIDEO PROCESSING

(71) Applicant: Assist Film, LLC, Boulder, CO (US)

(72) Inventors: Andrew Casner, Aurora, CO (US); Nicholas Erokhin, San Diego, CA (US); Leland Bolak, Boulder, CO (US)

(73) Assignee: Assist Film, LLC, Boulder, CO (US)

( * ) Notice: Subject to any disclaimer, the term of this patent is extended or adjusted under 35 U.S.C. 154(b) by 16 days.

(21) Appl. No.: 15/690,537

(22) Filed: Aug. 30, 2017

(51) Int. Cl.
- *H04N 5/915* (2006.01)
- *G06K 9/00* (2006.01)
- *H04N 5/93* (2006.01)

(52) U.S. Cl.
CPC ......... *H04N 5/915* (2013.01); *G06K 9/00711* (2013.01); *H04N 5/93* (2013.01); *G06K 2009/00738* (2013.01)

(58) Field of Classification Search
CPC ........................... H04N 5/915; G06K 9/00711
See application file for complete search history.

(56) References Cited

U.S. PATENT DOCUMENTS

| | | | |
|---|---|---|---|
| 6,631,522 B1 | 10/2003 | Erdelyi | |
| 8,091,111 B2 | 1/2012 | Logan et al. | |
| 9,060,210 B2 | 6/2015 | Packard et al. | |
| 9,141,860 B2 | 9/2015 | Vunic et al. | |
| 9,216,319 B2 | 12/2015 | DeAngelis et al. | |
| 2011/0173235 A1 | 7/2011 | Aman et al. | |
| 2015/0297949 A1 | 10/2015 | Aman et al. | |
| 2015/0312652 A1 | 10/2015 | Baker et al. | |
| 2015/0317341 A1 * | 11/2015 | Barker | G11B 27/034 707/746 |
| 2015/0332450 A1 | 11/2015 | Marty et al. | |
| 2016/0071548 A1 | 3/2016 | House et al. | |
| 2016/0171028 A1 | 6/2016 | MacCall | |
| 2016/0307598 A1 | 10/2016 | Johns | |
| 2016/0365120 A1 | 12/2016 | Steinberg et al. | |

FOREIGN PATENT DOCUMENTS

WO    2016166764 A1    10/2016

OTHER PUBLICATIONS

Kaiser, Rene & Umgeher, Martin & Hausenblas, Michael. (2008). Metadata-Based Adaptive Assembling of Video Clips on the Web. 9-14. 10.1109/SMAP.2007.42.

* cited by examiner

*Primary Examiner* — Thai Q Tran
*Assistant Examiner* — Girumsew Wendmagegn
(74) *Attorney, Agent, or Firm* — Marsh Fischmann & Breyfogle LLP; Russell T. Manning

(57) ABSTRACT

Systems and methods are described for automated in-play detection and edited video generation. For example, a received game footage file can be sampled to generate video frames, each with an associated frame time. A play clock dataset can be generated automatically by processing the video frames to visually identify a subset of the video frames as each including a displayed play clock. The play clock dataset can be used to generate play windows, such that each play window is associated with a respective sequence of the video frames over which a play time displayed by the play clock is changing. Techniques can be used to validate those play windows and/or to refine the start and stop times of those play windows. An in-play footage file can automatically be compiled by cutting the game footage file according to the start and stop times of the play windows.

21 Claims, 4 Drawing Sheets

AUTOMATED IN-PLAY DETECTION AND VIDEO PROCESSING

FIELD

Embodiments relate generally to video processing, and, more particularly, to machine vision and other video processing for automated in-play detection and video generation.

BACKGROUND

It is a constant goal of athletes and their coaches to improve performance. To that end, video recordings of sporting events are often reviewed in depth by the players and coaches to find areas for improvement. Typically, however, the overall time consumed and recorded for a particular event includes a large portion during which nothing of coaching-related interest is occurring. During much of the game time, the ball (or puck, etc.) is out-of-bounds, players are setting up for a next play, or the ball is otherwise out-of-play; the game is stopped for a time out or for logical break in play (e.g., half-time, between periods, etc.); the game is stopped for a commercial break, or the like; etc. As an example, a two-hour sporting event may only include 45 minutes during which the event is in play.

For review purposes, coaches and players generally only want to see portions of the video during which the event is in play. Conventionally, however, engaging with only the in-play footage has been undesirable. One common approach has been simply for the coach and/or players to manually scan through the entirety of the footage (e.g., by fast-forwarding and rewinding) to find portions of the event that are of interest. Such an approach can be time-consuming and frustrating. Another common approach has been for an individual, while watching the entirety of the video footage, to manually identify times in the footage when the game is in play, for example, by writing them down or by using a special video interface to create time indices. The coach and/or players can then use those indices to more efficiently scan through the footage. Still, such an approach is time-consuming and involves waiting for completion of the indexing. Yet another conventional approach has been to send the video to a third party, which can manually cut together only the relevant portions of the video and send back an edited game video for review by the coach and/or players. Such an approach tends to be preferable for coaches and players, but still typically involves waiting (often a full day or more) for the edited video.

BRIEF SUMMARY

Among other things, systems and methods are described for applying machine vision and other video processing for automated in-play detection and edited video generation. For example, a received game footage file can be sampled to generate video frames, each with an associated frame time. A play clock dataset can be generated automatically by processing the video frames to visually identify a subset of the video frames as each including a displayed play clock. The play clock dataset can be used to generate play windows, such that each play window is associated with a respective sequence of the video frames over which a play time displayed by the play clock is changing (e.g., indicating the game is in play). Various techniques can be used to validate those play windows and/or to refine the start and stop times of those play windows. Some of those techniques can involve importing and parsing third-party play-by-play data, and/or parsing a game time from the game footage to generate a game time domain mapping. An in-play footage file can automatically be compiled by cutting the game footage file according to the start and stop times of the play windows.

BRIEF DESCRIPTION OF THE DRAWINGS

The present disclosure is described in conjunction with the appended figures.

Figure 1:
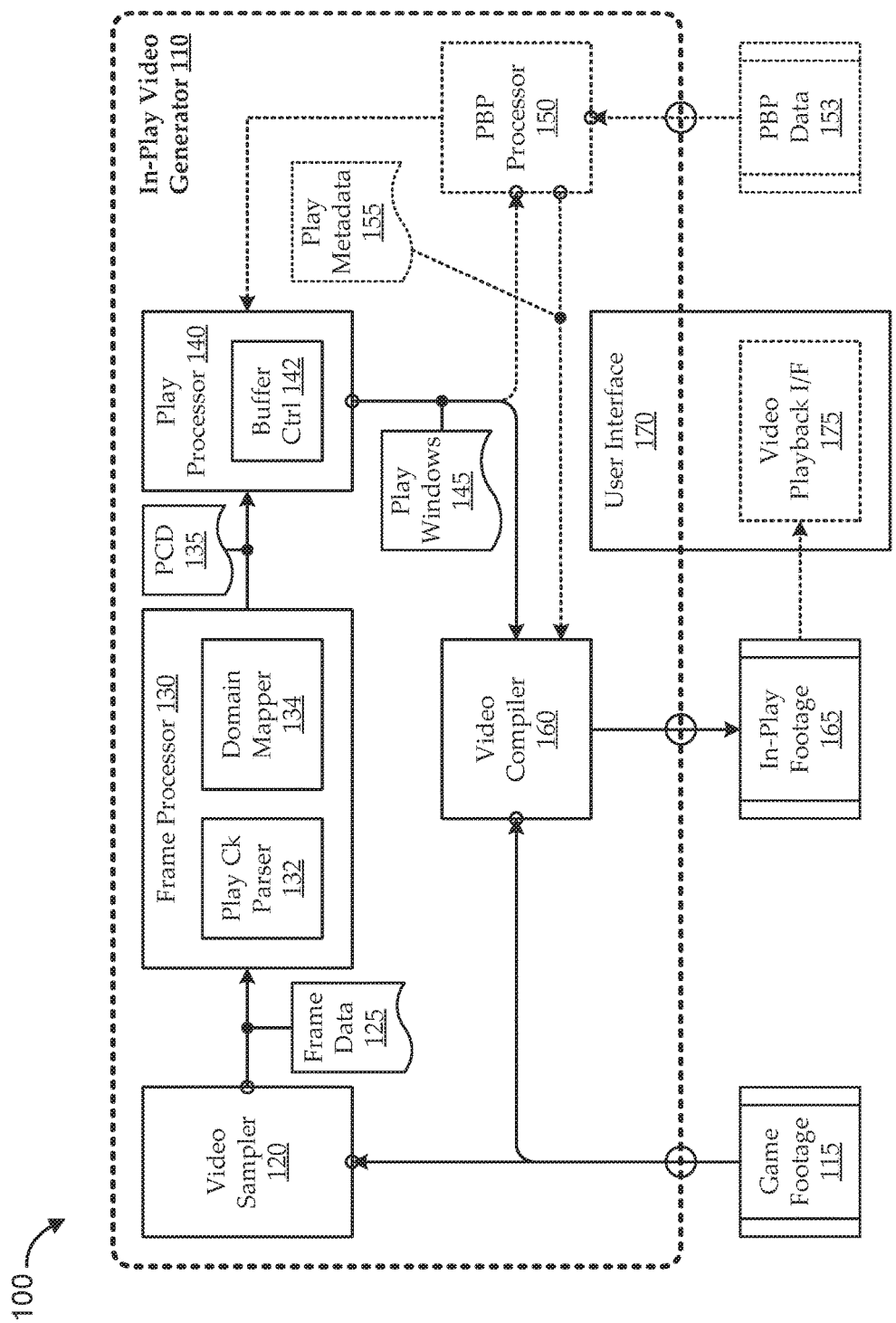
FIG. 1 shows a block diagram of an automated in-play video generation environment, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Coaches and players often desire to review footage of a sporting event to look for areas in which they can improve, but they generally only want to see portions of the video during which the event is in play. For example, more than half of the total time of a sporting event may be consumed by breaks between plays, logical game breaks (e.g., quarters, halves, periods, etc.), breaks for commercials, and the like. Conventionally, engaging with only the in-play footage has been a highly manual process and/or has involved waiting for completion of a manual process by a third party. For example, even the more advanced conventional approaches tend to involve an individual manually scanning through the footage looking for portions of interest and manually bookmarking those portions in a video interface.

A number of approaches to automation have been pursued, but they have tended to be unsuccessful. One category of an existing automation approach uses in-event sensors. For example, devices held by the game officials (e.g., referees), official timekeepers, etc. permit capturing of information relating to the beginning and end of plays, and the like, during the event; and that information can be automatically matched with relevant timing information in the event video footage. While such an approach can be effective, it relies on dedicated equipment being used within and during the event, which may not be practical or available in most instances. Another category of an existing automation approach post-processes video footage to look for and/or match highlight-related cues, such as detecting crowd cheering noise, an uptick in social media activity, etc. While such an approach can be somewhat effective with respect to highlights, such approaches do not provide any reliable detection of normal event play. Yet another category of existing automation approach uses advanced video processing to follow the ball (or puck, etc.), follow one or more players, or the like. To date, such approaches have tended to be ineffective, or at least inconsistent, and have not yielded a viable solution. For example, it can be exceedingly difficult to follow the ball or a player, particularly in context of real-world characteristics of event video footage, such as constant cuts between different camera angles and zoom levels, cut-aways (e.g., to shots of fans, brief advertisements, instant replays, statistics screens, etc.), and the like.

Embodiments described herein provide novel techniques for applying machine vision and other video processing for automated in-play detection and edited video generation. In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Turning first to FIG. 1, a block diagram is shown of an automated in-play video generation environment 100, according to various embodiments. The environment 100 includes an in-play video generation system 110 that receives a game footage file 115 and can automatically generate a compiled in-play footage file 165. The game footage file 115 can include raw video footage, broadcast footage, unedited footage, and/or any other suitable video footage of a game that includes game in-play times and game not-in-play times. As used herein, a "game in-play" times are considered to be when play-related action is occurring that is determined to be of interest to a coach, player, scout, trainer, and/or the like. Notably, the game in-play times are not the highlights of the game; highlights of a game likely include a small portion of the game in-play times in a game (i.e., only those plays of particular note to fans) and may include additional footage from game not-in-play times, such as when something surprising happens in the stands. It is typical that the total duration of game in-play times in a game is a small portion of the total duration of the game footage file 115. For example, in a typical football game, a large percentage of the game time is spent between plays (e.g., during commercial breaks, during time outs, while a team is setting up for a play, etc.). In recent years, studies have shown that professional televised football games are typically over three hours long and include only about 11 to 17 minutes of active play time. Professional basketball games often last well over two hours and include a set amount of total play time (e.g., 48 minutes, divided into 12-minute quarters), and some of the total play time may not be of interest (e.g., while the offense is slowly bringing the ball down the court, etc.). Generally, embodiments of the in-play video generation system 110 seek to automatically generate the in-play footage file 165 to include only the portions of the game footage file 115 relevant to the game in-play times.

Embodiments of the in-play video generation system 110 include a video sampler 120, a frame processor 130, a play processor 140, and a video compiler 160. The video sampler 120 can include a first raw video input 121 to receive the game footage file 115. For example, the first raw video input 121 can be coupled with a local data storage device (not shown) that has the game footage file 115 stored thereon. Alternatively, the first raw video input 121 can be coupled with one or more remote data stores and/or remote servers over a network, or any other suitable communications link, from which the game footage file 115 can be received. The video sampler 120 can also include a sampled video output 122 that outputs frame data 125. The frame data 125 can include video frames sampled from the first raw video input 121 at a sampling rate, such that each video frame has an associated frame time. The associated frame time can be a timestamp, a frame number, or any other suitably unique identifier of the video frame from the game footage file 115.

The sampling rate can be any suitable rate. According to one implementation, the game footage file 115 is recorded at 30 frames per second, and the sampling rate is one second, so that approximately one out of every thirty frames of the game footage file 115 is output as part of the frame data 125. For example, as described below, some implementations exploit external play-by-play data that is timestamped at a particular fidelity (e.g., minutes and seconds), and sampling at a comparable fidelity (e.g., one frame sample per second) can support integration of that play-by-play data. In other cases, it can be desirable to sample less frequently (e.g., to reduce file size or processing burden) or more frequently.

Embodiments of the frame processor 130 can be coupled with the video sampler 120 to receive the frame data 125 (e.g., the video frames and associated frame times). The frame processor 130 can include a play clock parser 132 that generates a play clock dataset 135 automatically by processing the video frames to visually identify a subset of the video frames that each includes a displayed play clock. As used herein, the "play clock" is an official short-duration clock within a game that tracks play-specific timing. For example, the play clock in basketball is the shot clock (e.g., a 24-second clock in the National Basketball Association, and a 30-second clock in some other leagues), which effectively runs the duration of each play and restarts before the next play. In the National Football League, the play clock is a 40-second timer starting from the end of each previous down, and a 25-second timer starting when a ball is ready for play after particular events (e.g., game delays, stoppages, etc.). In contrast, games also have a "game clock," which refers herein to the clock that tracks the total game time. For example, basketball games can have 12-minute quarters, 20-minute halves, 8-minute quarters, or other game timing, depending on the league; football can have 15-minute quarters, 12-minute quarters, or other game timings, depending on the league; etc.

In some implementations, the play clock parser 132 includes a machine vision parser that analyzes each frame (e.g., some or all frames) to find visual data characteristic of a play clock. For example, the play clock is often displayed as two-digits following a colon (with no digits preceding the colon). Some implementations use large sets of game footage as training data for machine learning algorithms to visually recognize the play clock within a video frame. In some cases, implementations can rely on other known characteristics of the play clock. For example, a particular video producer may always overlay the play clock at a same video frame location, may always use a particular color for the play clock foreground and/or background, etc. Alternatively, some implementations of the play clock parser 132 receive dedicated information indicating the play clock. For example, a dedicated camera can be focused on the play clock during the game, such that the game footage file 115 includes direct footage of the play clock that can be used by the play clock parser 132.

In some embodiments, the play clock dataset 135 is generated to include some or all of the video frames identified as displaying the play clock and the associated frame time for each of those video frames. Additionally or alternatively, generating the play clock dataset 135 can include analyzing the identified video frames to derive one or more play clock time values. For example, optical character recognition techniques can be applied to the portion of a video frame having the play clock, such that the play clock time displayed by the play clock is derived. Some implementations can use partial play time information to refine the play clock dataset 135. For example, if analysis of a particular frame results in a derived play clock time of "19 seconds," certain implementations can exploit inherent features of the play clock to derive play clock times for a previous sequence of frames (e.g., in context of a 24-second count-down shot clock and a frame sampling rate of one second, it can be assumed that the preceding five video frames can be associated with play clock times of "24 seconds" through "20 seconds"). In some implementations, such techniques are used only when the play clock time is derived with at least a threshold confidence level (e.g., a low probability of error). In such implementations, multiple frames within a time window can be analyzed, or other techniques can be used to refine, or increase the confidence level of, the play clock time derivation. Using direct derivation, or extrapolating backwards from a derived play clock time, the above techniques can be used to determine a video frame corresponding to a beginning of a play clock time sequence (e.g., when the play clock first starts to count down). Accordingly, some implementations generate the play clock dataset 135 to include information indicating the beginning of each play clock sequence. For example, the play clock dataset 135 can include only the set of frame times associated with the video frames corresponding to the beginning of each play clock sequence. Using the above techniques, the play clock dataset 135 can be used to derive partial or complete play clock time sequences that correspond to game in-play times.

Embodiments of the play processor 140 are coupled with the frame processor 130 to receive the play clock dataset 135. The play processor 140 can include a play output 141 that outputs play windows 145 generated automatically as a function of the play clock dataset 135. Each play window can correspond to a sequence of the video frames that begins at a respective start frame time and ends at a respective stop frame time. Embodiments can seek to generate the play windows 145 to correspond to the game in-play times. In some embodiments, the play windows are defined as a function of the play clock time sequences derived from the displayed play clocks included in the subset of video frames, such that each play window comprises a respective sequence of the video frames corresponding to a respective one of the play clock time sequences. As one example, in basketball, much of the active game in-play time occurs during the times when the shot clock is running. Accordingly, in some embodiments, the beginning and ending of each derived play clock time sequence can correspond to a beginning and ending of a play, and a corresponding play window can be generated to include a sequence of video frames indicating that play clock time sequence. As another example, in football, the play clock runs between plays, such that much of the active game in-play time begins around each time when the play clock stops running. Accordingly, in some embodiments, the ending of each derived play clock time sequence can correspond to a beginning of a play, and a corresponding play window can be generated to include a sequence of video frames subsequent to those indicating that play clock time sequence.

In some embodiments, some or all of the play windows 145 can be validated, refined, and/or otherwise impacted by additional features. Some embodiments of the play processor 140 include a buffer controller 142 that can expand each of at least a portion of the play windows to include additional frames adjacent to the respective sequence of the video frames according to buffer settings. For example, the buffer controller 142 can include, or have access to, a data store having stored thereon buffer settings, and the buffer settings can be hard-coded, set to default values until changed, programmable via hardware or software, etc. In some embodiments, the in-play video generation system 110 includes a user interface 170 to accept inputs from a user (e.g., via a graphical user interface, via one or more hardware interface devices, etc.). In such embodiments, programmable buffer settings can be received from a user, and the buffer controller 142 can expand each of at least a portion of the play windows 145 according to the programmable buffer settings.

The buffer settings can define an expansion (e.g., an amount of time, a number of frames, etc.) to add to the beginning and/or to the end of each play window 145. In one implementation, the expansion is the same for all play windows 145 and the same for both the beginning and the end of each play window 145 (e.g., for each play window 145, the buffer controller 142 automatically expands the play window 145 to include 3 seconds of adjacent footage before and after the play window 145). In other implementations, the amount of time added to the beginning of each play window 145 can be different from the amount of time added to the end of each play window 145. In still other implementations, different amounts of time can be added to different play windows 145 depending on certain characteristics (e.g., where the play window 145 falls within the context of the overall game time, a determined play time, etc.). In other implementations, one or more of the buffer settings can define a negative expansion value, so that a portion of the beginning and/or ending of a play window 145 is affectively cropped.

Embodiments of the video compiler 160 can include a second raw video input 161 to receive the game footage file 115 and can be coupled with the play processor 140 to receive information defining the play windows 145. The video compiler 160 can automatically compile an in-play footage file 165 by cutting the game footage file 115 according to the respective start frame times and the respective stop frame times of the play windows 145. In some implementations, the video compiler 160 automatically cuts together segments (plays) of the game footage file 115 defined by the start and end frame times associated with the play windows (e.g., including any expansions, etc.). Some implementations can add features to the compiled video, such as transitions between plays (e.g., hard cuts, fades, etc.). Some embodiments compile the in-play footage file 165 to include time indices (e.g., bookmarks, or the like) at each play to facilitate play-based navigation through the video (e.g., jumping from one play to another without scrolling linearly through the footage).

Some embodiments of the in-play video generation system 110 include a play-by-play (PBP) processor 150 to provide various features based on timestamped PBP data 154 separate from the game footage file 115. The timestamped PBP data 154 can be received via a first PBP interface 151. A second PBP interface 152 of the PBP processor 150 can be coupled with the play processor 140 to receive window timing data associated with at least some of the play windows 145, and a third PBP interface 153 can output a set of play metadata 155 associated with each of the at least some of the play windows 145 for use by the video compiler 160 (as described below). In some implementations, the timestamped PBP data 154 is third-party PBP data received from a remote server via a communications network. In other implementations, the data can be stored locally to the in-play video generation system 110. The timestamped PBP data 154 can include real-time and/or non-real-time data retrieved for any of a wide variety of sporting events via a particular application programming interface (API), or the like. The timestamped PBP data 154 can be timestamped according to the official game time (e.g., as indicated by a game clock, or as derived from a game clock), or according to any other suitable time reference (e.g., local time at the location of the game, Greenwich mean time, time elapsed from the start of broadcast, etc.).

The second PBP interface 152 of the PBP processor 150 can be coupled with the play processor 140 to receive window timing data associated with at least some of the play windows 145. For example, via the second PBP interface 152, the PBP processor 150 can receive start and/or stop times (e.g., respective frame times) for some or all of the play windows 145. Embodiments of the PBP processor 150 can map the timing of the timestamped PBP data 154 to the timing information for the play windows 145, so that particular portions of the timestamped PBP data 154 can be associated with each play window 145. The associated information can be adapted for associated with the video footage data as play metadata 155. In some embodiments, the play metadata 155 is output by the third PBP interface 153 for use by the video compiler 160. For example, the video compiler 160 can output the in-play footage file 165 to in a manner that associates each play segment of the video with appropriate play metadata 155. Some embodiments permit user configuration of which timestamped PBP data 154 is imported by the PBP processor 150 and/or which types of play metadata 155 to associate with play windows 145.

Some embodiments feed some or all of the timestamped PBP data 154 (or the play metadata 155, or data otherwise derived from the timestamped PBP data 154) back to the play processor 140 for additional features. In some such embodiments, the timestamped PBP data 154 indicates, for each of at least some of the play windows 145, a respective play type selected from multiple predefined play types. For example, each play window 145 can be associated with a play characterized as a "drive by team A," "drive by team B," "turnover," "interception," "successful two-point shot," etc. Any suitable number and types of plays can be available for selection or designation by the timestamped PBP data 154. The buffer controller 142 of the play processor 140 can expand one or more play windows 145 to include additional frames adjacent to the respective sequence of the video frames according to a play-type-dependent buffer setting selected for the play window according to the respective play type. For example, coach may desire to see more footage adjacent to plays where the coach's team is on defense than where the coach's team is on offense. Accordingly, the buffer settings can be programmed to (or can have default values to) implement such results. For example, when a play window 145 is identified by the play processor 140, the received data from the PBP processor 150 can be used to associate the identified play window 145 with a particular play type; and play-type-dependent buffer settings can be applied (e.g., via a lookup table, or the like).

In other such embodiments, the data received from the PBP processor 150 can be used to validate play windows 145 generated by the play processor 140. Embodiments of the play processor 140 generate at least some of the play windows 145 by generating corresponding candidate windows according to play clock derivation, as described above. For each candidate window, the data received from the PBP processor 150 can be consulted (e.g., by the play processor 140) to determine whether there is an indication that a play occurred in temporal correspondence to (e.g., at substantially the time of) the candidate window. When the data received from the PBP processor 150 indicates that a play occurred in temporal correspondence with the candidate window, the play processor 140 can consider (e.g., flag, etc.) the candidate window as a validated play window. Some embodiments of the video compiler 160 automatically compile the in-play footage file 165 only to include portions of the game footage file 115 corresponding to the validated play windows. In some embodiments, the play window validation is used additionally or alternatively to refine the starting and/or ending time of one or more play windows 145 (or vice versa). As described above, the starting and/or ending time of a play window 145 is, in many cases, extrapolated from derived data. For example, in football, the play clock may reliably indicate the start of a play, but may not be a reliable indication of the end of a play; and the timestamped PBP data 154 can provide additional information useful for determining an ending time of a play. Similarly, particularly where the timestamped PBP data 154 is manually input or out-of-synch with the footage of the game footage file 115, the identified play window timing can be used to refine the timing of the play metadata 155, or the like.

In some cases, the candidate windows are associated with timing in a frame timing domain (i.e., a starting and ending frame time, a frame index, a video timestamp, etc.), and the data received from the PBP processor 150 (e.g., the timestamped PBP data 154) is in a different time domain (e.g., broadcast time, game time, etc.). Accordingly, some embodiments of the frame processor 130 further include a domain mapper 134 that maps the frame time domain to an appropriate time domain that facilitates exploitation of the timestamped PBP data 154 (and/or data derived therefrom). Some such embodiments can process the video frames from the game footage file 115 automatically to derive a game time domain by automatically parsing a game time from a visible game clock in each of multiple of the video frames. The time domain mapping can be used to implement features described herein, such as enabling play window validation and/or refinement based on timestamped PBP data 154, association of play metadata 155 with play windows 145, etc.

Though some embodiments can compile the in-play footage file 165 in a manner that includes all of the play windows 145, and only the play windows 145, other compilation options are available in some embodiments. For example, some implementations of the video compiler 160 include a fixed footage setting that can be set by default and/or by user input. According to the fixed footage setting, the video compiler 160 can automatically compile the in-play footage file 165 to include a fixed portion of game play (e.g., the last two minutes of the game, the last 45 second before each quarter end, etc.), regardless of whether individual play windows are identified. In other implementations, additional play windows 145 can be identified in accordance with the timestamped PBP data 154, even where no play clock is identified. For example, during a window while free throws are being taken in basketball, neither the game clock nor the play clock is running; but those windows may be of interest to the coach, players, etc. Accordingly, the timestamped PBP data 154 can be parsed automatically by the play processor 140 to find such plays, and corresponding play windows 145 can be generated for compilation by the video compiler 160 as part of the in-play footage file 165. In still other implementations, filter settings can identify a subset of identified play windows 145 to be included in the compiled in-play footage file 165. For example, an offensive coordinator for Team A may desire to watch a video of only those plays during which Team A was on offense, or a player may desire to watch only those plays in which the player participated. In some such implementations, the play processor 140 has access to the filter settings, and the play processor 140 can consult the data received from the PBP processor 150 to determine, for each identified (e.g., candidate) play window, whether to output the window as a play window 145 for compilation. In other such implementations, the play processor 140 can output all the play windows 140, and the video compiler 160 has access to the filter settings, so that the video compiler 160 can compile only an applicable subset of the received play windows 145 as part of the in-play footage file 165.

As illustrated, some embodiments of the in-play video generation system 110 (and/or the greater environment 100) include a user interface 170 that can include a video playback interface 175. The video playback interface 175 can receive the compiled in-play footage file 165 and can include various controls and/or other features to facilitate playback, navigation, annotation, and/or the like. In some embodiments, the video playback interface 175 can also receive and playback the game footage file 115. Though not explicitly shown, the video playback interface 175 can have access to video files and/or other information via one or more local storage devices, via one or more servers over one or more communications networks, etc.

Figure 2:
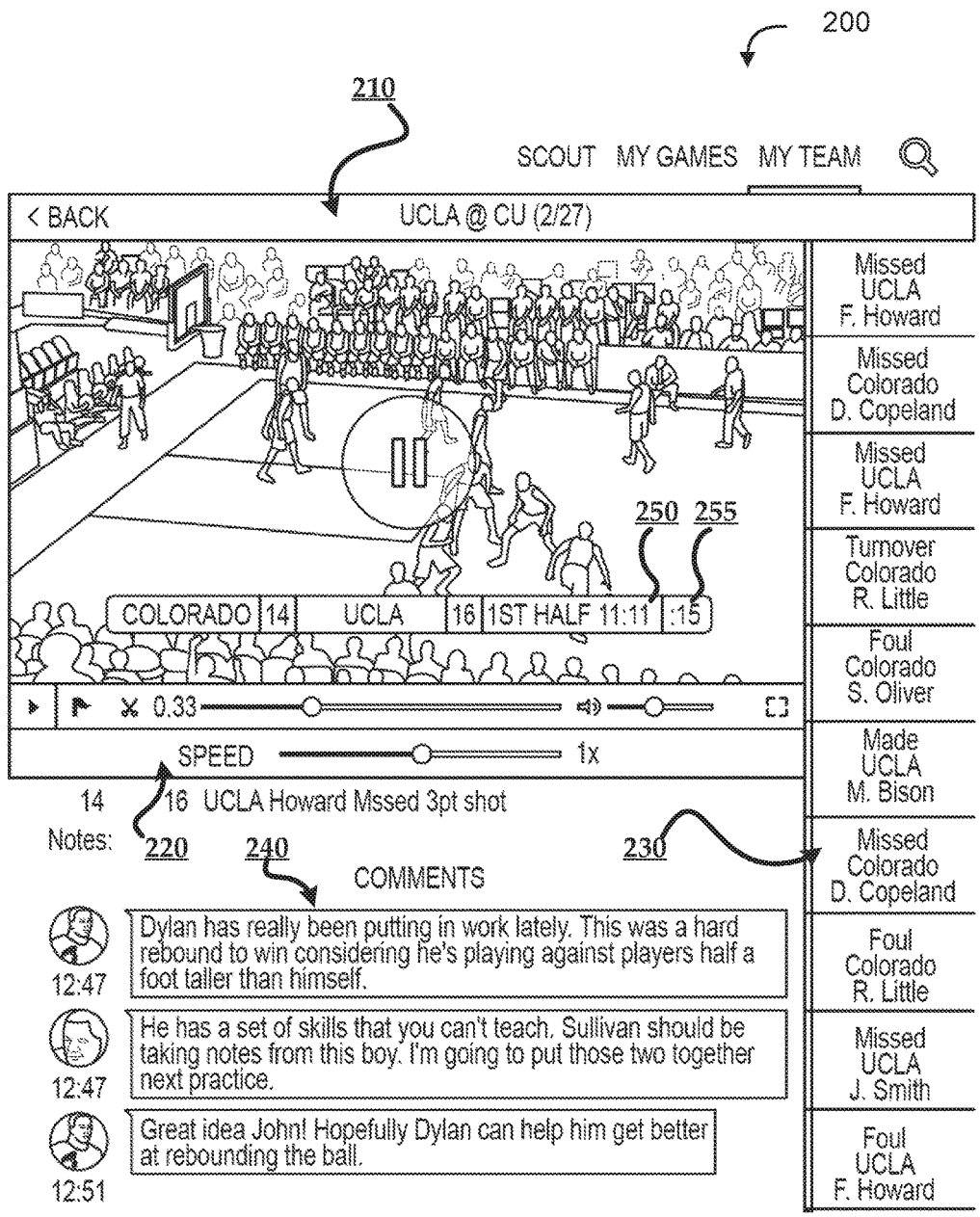
FIG. 2 shows a screenshot of an illustrative graphical interface, such as the video playback interface of FIG. 1, to illustrate certain features.

FIG. 2 shows a screenshot of an illustrative graphical interface 200, such as the video playback interface 175 of FIG. 1, to illustrate certain features. The graphical interface 200 can generally include a playback window 210 for playback of the in-play footage file 165 and can include any suitable controls 220, such as navigation controls for navigating the playback (e.g., play, pause, stop, fast-forward, skip, adjust playback speed, adjust volume, etc.). Some embodiments include play-aware controls. For example, the graphical interface 200 can include controls for skipping between plays (e.g., facilitated by time indices generated by the video compiler 160 in association with the play windows), searching for particular plays, filtering plays, etc. For the sake of illustration, the displayed frame of the in-play footage file 165 shows an illustrative game clock 250 and play clock 255 (shot clock).

Embodiments of the graphical interface 200 can also display play-by-play information 230 as graphical representations of the play metadata 155 in visual association with playback of in-play footage file 165, such that graphical representations associated with a particular one of the play windows 145 are displayed during playback of a portion of the in-play footage file 165 associated with the particular one of the play windows 145. The graphical interface 200 can also include any suitable controls for programming and/or viewing settings, such as buffer settings, filter settings, etc. (not explicitly shown). Some embodiments of the user interface 170 can include additional interaction features 240, such as for enabling marking of the in-play footage file 165 or the play metadata 155 (e.g., to permit annotation on the video footage, time-based note taking, indexing, frame capturing, measurement or statistical analysis, etc.), collaboration (e.g., chat or messaging, video sharing, etc.), etc.

Figure 3:
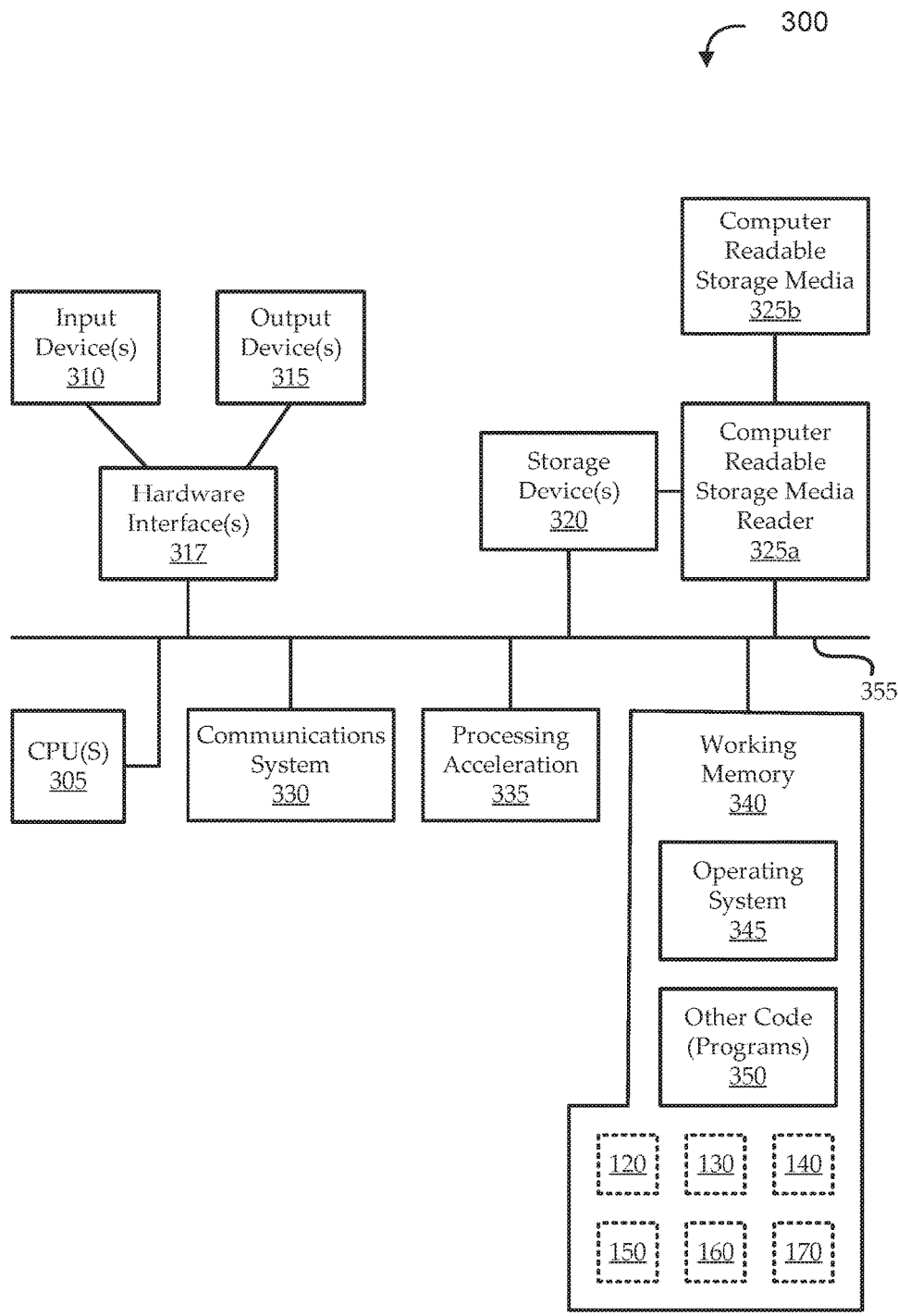
FIG. 3 shows an illustrative computational system for implementing certain functionality of an in-play video generation system, according to various embodiments.

FIG. 3 shows an illustrative computational system 300 for implementing certain functionality of an in-play video generation system, according to various embodiments. The computational system 300 can include or perform functionality of components of the in-play video generation system 110 of FIG. 1 and/or functionality of various portions of such a system. For the sake of simplicity, the computational system 300 is shown including hardware elements that can be electrically coupled via a bus 355. However, embodiments of the computational system 300 can be implemented as or embodied in single or distributed computer systems, in one or more locations, or in any other useful way. The hardware elements can include a set of (e.g., one or more) central processing units (CPUs) 305, which can be implemented using any suitable processors, and may include (or interface with) one or more processing acceleration 335 blocks.

In some embodiments, the CPU(s) 305 include interface languages, protocols, and/or structures for communicating with each other, with one or more input devices 310, with one or more output devices 315, with other computational systems, and/or with other structures. In other embodiments, hardware interface devices 317 are included for interfacing between components of the computational system 300 and input devices 310 and/or output devices 315. The input devices 310 can include standard input controllers (e.g., a mouse, a keyboard, etc.), specialized input devices (e.g., video editing equipment), and/or any other suitable input devices 310. The output devices 315 can include standard output devices (e.g., a display), and/or any other suitable output devices 315. In some implementations, the hardware interface devices 317 include drivers for interfacing with (e.g., converting signals to and/or from) the various input devices 310 and/or output devices 315, physical and/or logical ports, etc. Some embodiments can further include a communications system 330 (e.g., a modem, a network card (wireless or wired), an infra-red communication device, etc.), which can permit data to be exchanged with a network and/or any other computational system. For example, the communications system 330 can enable communication with remote storage and/or servers for exchanging video footage (e.g., game footage files 115, in-play footage files 165, etc.), for importing timestamped PBP data 154, etc.

The computational system 300 can also include one or more storage devices 320. By way of example, storage device(s) 320 can include disk drives, optical storage devices, solid-state storage device such as a random access memory (RAM) and/or a read-only memory (ROM), which can be programmable, flash-updateable and/or the like. In some embodiments, the storage devices 320 can include or can be in communication with data stores for storing game footage files 115, in-play footage files 165, buffer settings, filter settings, any intermediate data (e.g., frame data 125, play clock datasets 135, play windows 145, play metadata 155, etc.), and/or any other suitable data. The computational system 300 can additionally include a computer-readable storage media reader 325a, which can be connected to a computer-readable storage medium 325b, together (and, optionally, in combination with storage device(s) 320) comprehensively representing remote, local, fixed, and/or removable storage devices plus storage media for temporarily and/or more permanently containing computer-readable information.

Embodiments of the computational system 300 further include working memory 340, which can include RAM and ROM devices as described above. The computational system 300 can also include software elements, shown as being currently located within a working memory 340, including an operating system 345 and/or other code 350, such as an application program (which can be a client application, web browser, mid-tier application, database application, etc.). In some embodiments, one or more functions of the in-play video generation system can be implemented as application code 350 in working memory 340. For example, working memory 340 (or any other suitable non-transient memory) can store instructions, which, when executed, can cause the set of processors 305 to perform functions of the video sampler 120, frame processor 130, play processor 140, video compiler 160, PBP processor 150, user interface 170, and/or any other suitable functionality described herein.

Figure 4:
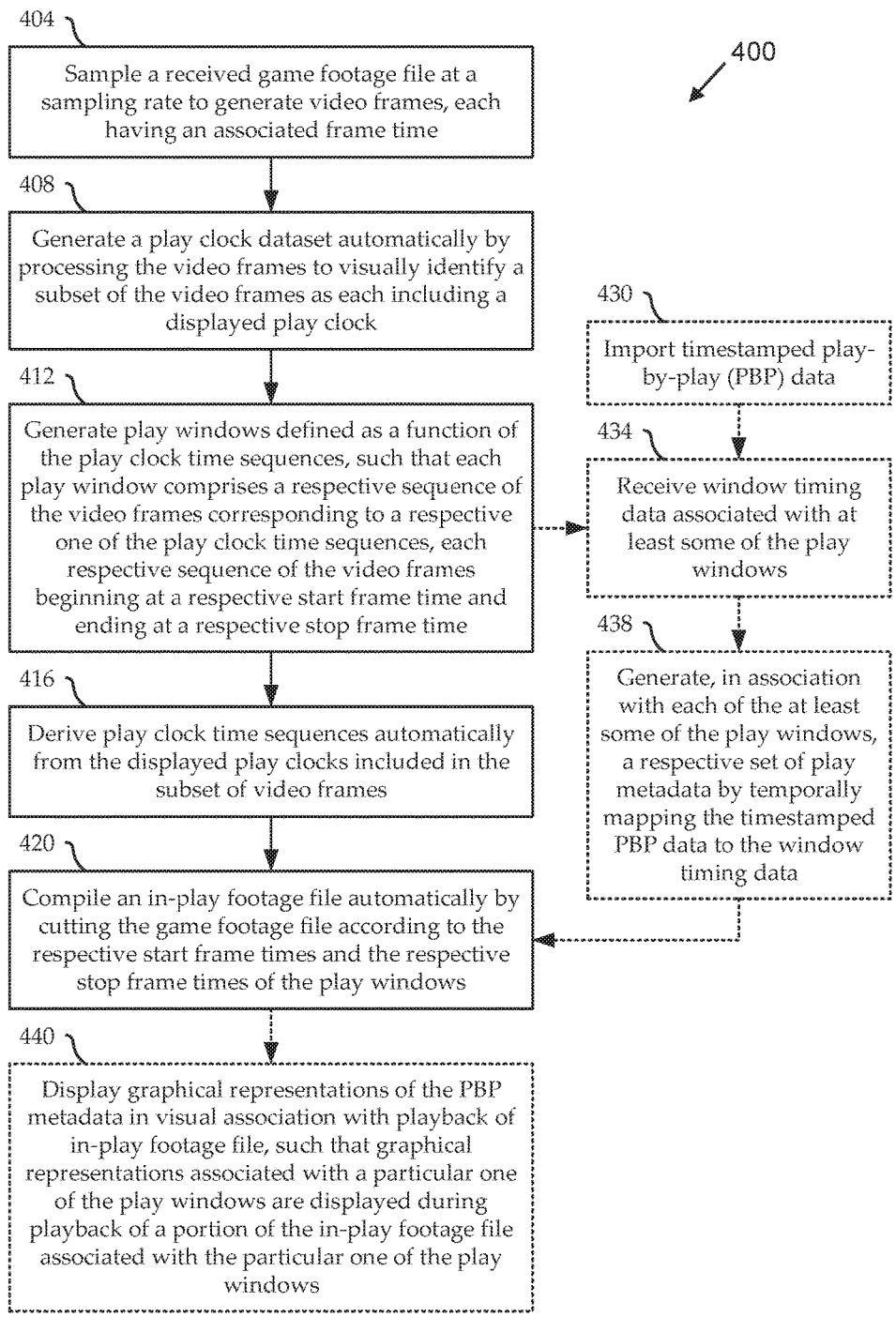
FIG. 4 shows a flow diagram of an illustrative method for automatic in-play video generation, according to various embodiments.

FIG. 4 shows a flow diagram of an illustrative method 400 for automatic in-play video generation, according to various embodiments. Embodiments of the method 400 begin at stage 404 by sampling a received game footage file at a sampling rate to generate video frames, each having an associated frame time. At stage 408, embodiments can generate a play clock dataset automatically by processing the video frames to visually identify a subset of the video frames as each including a displayed play clock. Embodiments can continue, at stage 412, by deriving play clock time sequences automatically from the displayed play clocks included in the subset of video frames.

At stage 416, embodiments can generate play windows defined as a function of the play clock time sequences, such that each play window includes a respective sequence of the video frames corresponding to a respective one of the play clock time sequences, each respective sequence of the video frames beginning at a respective start frame time and ending at a respective stop frame time. In some implementations, the respective start frame time of at least one of the play windows is defined according to a beginning play clock time of a corresponding one of the play clock time sequences. In other implementations, the respective start frame time of at least one of the play windows is defined according to an ending play clock time of a corresponding one of the play clock time sequences. According to some embodiments, generating the play windows at stage 412 can include expanding each of at least a portion of the play windows to include additional frames adjacent to the respective sequence of the video frames according to buffer settings (e.g., programmable settings). Embodiments can compile, as stage 420, an in-play footage file automatically by cutting the game footage file according to the respective start frame times and the respective stop frame times of the play windows.

Some embodiments exploit play-by-play (PBP) data, such as timestamped PBP data generated by third parties or otherwise separately from the game footage file. For example, at stage 430, embodiments can import timestamped PBP data. At stage 434, window timing data associated with at least some of the play windows can be received. Embodiments can continue at stage 438 by generating, in association with each of the at least some of the play windows, a respective set of play metadata by temporally mapping the timestamped PBP data to the window timing data. As described above, the timestamped PBP data and/or the generated play metadata can be used to enable various features, including validating play windows, refining beginning or ending times of play windows, adding or filtering play windows, impacting compilation of in-play footage files, impacting display of in-play footage files, impacting interaction with in-play footage files, etc. In some embodiments, at stage 440, graphical representations of the play metadata can be displayed in visual association with playback of in-play footage file, such that graphical representations associated with a particular one of the play windows are displayed during playback of a portion of the in-play footage file associated with the particular one of the play windows.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A video processor system comprising:
a video sampler having a first raw video input to receive a game footage file and having a sampled video output comprising a plurality of video frames sampled from the raw video input at a sampling rate, such that each video frame has an associated frame time;
a frame processor coupled with the video sampler to receive the plurality of video frames and comprising a play clock parser that generates a play clock dataset automatically by processing the video frames to visually identify a subset of the video frames that each includes a displayed play clock;
a play processor coupled with the frame processor to receive the play clock dataset and having a play output comprising a plurality of play windows generated automatically as a function of the play clock dataset, such that the play windows are defined as a function of play clock time sequences derived from the displayed play clocks included in the subset of video frames, and each play window comprises a respective sequence of the video frames corresponding to a respective one of the play clock time sequences, each respective sequence of the video frames beginning at a respective start frame time and ending at a respective stop frame time; and
a video compiler having a second raw video input to receive the game footage file and coupled with the play processor to automatically compile an in-play footage file by cutting the game footage file according to the respective start frame times and the respective stop frame times of the plurality of play windows.

2. The system of claim 1, wherein the play processor comprises a buffer controller that expands each of at least a portion of the play windows to include additional frames adjacent to the respective sequence of the video frames according to programmable buffer settings.

3. The system of claim 1, further comprising:
a user interface to accept programmable buffer settings from a user,
wherein the play processor comprises a buffer controller that expands each of at least a portion of the play windows to include additional frames adjacent to the respective sequence of the video frames according to the programmable buffer settings.

4. The system of claim 1, further comprising:
a play-by-play (PBP) processor having a first PBP interface to import timestamped PBP data, a second PBP interface coupled with the play processor to receive window timing data associated with at least some of the play windows, and a third PBP interface to output a set of play metadata associated with each of the at least some of the play windows, the sets of play metadata generated by temporally mapping the timestamped PBP data to the window timing data.

5. The system of claim 4, wherein:
the frame processor further comprises a game time mapper that processes the video frames automatically to derive a game time domain by automatically parsing a game time from a visible game clock in each of multiple of the video frames, such that each of the subset of the video frames has an associated frame time that is mappable to the game time domain; and
the sets of play metadata are generated by temporally mapping the timestamped PBP data to the window timing data using the game time domain.

6. The system of claim 4, wherein:
the play processor generates at least some of the plurality of play windows by generating corresponding candidate windows according to the respective sequences of the video frames, and validating the candidate windows as a validated play windows according to whether the timestamped PBP data indicates a play in temporal correspondence with each of the candidate windows.

7. The system of claim 6, wherein:
the video compiler is to automatically compile the in-play footage file only to include portions of the game footage file corresponding to the validated play windows.

8. The system of claim 6, wherein:
the validating comprises refining at least one of the respective start frame time or the respective stop frame time of at least one of the play windows according to the timestamped PBP data.

9. The system of claim 4, wherein, for each of at least a portion of the play windows:
the timestamped PBP data indicates a respective play type selected from a plurality of predefined play types; and
the play processor comprises a buffer controller that expands the play window to include additional frames adjacent to the respective sequence of the video frames according to a play-type-dependent buffer setting selected for the play window according to the respective play type.

10. The system of claim 4, further comprising:
a video playback interface to display graphical representations of the play metadata in visual association with playback of in-play footage file, such that graphical representations associated with a particular one of the play windows are displayed during playback of a portion of the in-play footage file associated with the particular one of the play windows.

11. The system of claim 1, further comprising:
a video playback interface comprising interface controls to control playback of the in-play footage file,
wherein the video compiler further compiles the in-play footage file automatically to include a plurality of time indices each corresponding to a respective one of the play windows, and
user interaction with the interface controls navigates playback of the in-play footage file according to the time indices.

12. A method for video processing comprising:
sampling a received game footage file at a sampling rate to generate a plurality of video frames, each having an associated frame time;

generating a play clock dataset automatically by processing the video frames to visually identify a subset of the video frames as each including a displayed play clock;

deriving play clock time sequences automatically from the displayed play clocks included in the subset of video frames;

generating a plurality of play windows defined as a function of the play clock time sequences, such that each play window comprises a respective sequence of the video frames corresponding to a respective one of the play clock time sequences, each respective sequence of the video frames beginning at a respective start frame time and ending at a respective stop frame time; and compiling an in-play footage file automatically by cutting the game footage file according to the respective start frame times and the respective stop frame times of the plurality of play windows.

13. The method of claim 12, wherein:
the respective start frame time of at least one of the play windows is defined according to a beginning play clock time of a corresponding one of the play clock time sequences.

14. The method of claim 12, wherein:
the respective start frame time of at least one of the play windows is defined according to an ending play clock time of a corresponding one of the play clock time sequences.

15. The method of claim 12, wherein generating the plurality of play windows comprises expanding each of at least a portion of the play windows to include additional frames adjacent to the respective sequence of the video frames according to programmable buffer settings.

16. The method of claim 12, further comprising:
importing timestamped play-by-play (PBP) data;
receiving window timing data associated with at least some of the play windows; and
generating, in association with each of the at least some of the play windows, a respective set of play metadata by temporally mapping the timestamped PBP data to the window timing data, wherein the compiling is in accordance with the timestamped PBP data.

17. The method of claim 16, wherein generating the sets of play metadata comprises:
processing the video frames to derive a game time domain by automatically parsing a game time from a visible game clock in each of multiple of the video frames, such that each of the subset of the video frames has an associated frame time that is mappable to the game time domain; and
temporally mapping the timestamped PBP data to the window timing data using the game time domain.

18. The method of claim 16, wherein generating at least some of the plurality of play windows comprises:
generating corresponding candidate windows according to the respective sequences of the video frames; and
validating the candidate windows as a validated play windows according to whether the timestamped PBP data indicates a play in temporal correspondence with each of the candidate windows.

19. The method of claim 18, wherein the validating comprises refining at least one of the respective start frame time or the respective stop frame time of at least one of the play windows according to the timestamped PBP data.

20. The method of claim 16, wherein generating the plurality of play windows comprises:
expanding at least a portion of the play windows to include additional frames adjacent to the respective sequence of the video frames according to a play-type-dependent buffer setting selected for the play window according to a respective play type,
wherein the timestamped PBP data for the portion of the play windows indicates a respective play type selected from a plurality of predefined play types.

21. The method of claim 16, further comprising:
displaying graphical representations of the play metadata in visual association with playback of in-play footage file, such that graphical representations associated with a particular one of the play windows are displayed during playback of a portion of the in-play footage file associated with the particular one of the play windows.

* * * * *